(12) United States Patent
Uchiyama et al.

(10) Patent No.: US 9,289,713 B2
(45) Date of Patent: Mar. 22, 2016

(54) BLENDED NONWOVEN FABRIC, FILTER MEDIUM, AND FILTER UNIT

(71) Applicant: NITTO DENKO CORPORATION, Ibaraki-shi, Osaka (JP)

(72) Inventors: Shiho Uchiyama, Osaka (JP); Yuri Horie, Osaka (JP); Masahiro Arai, Osaka (JP); Masaaki Mori, Osaka (JP); Tetsuo Asano, Gifu (JP); Nobuhiro Matsunaga, Gifu (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 14/377,769

(22) PCT Filed: Feb. 18, 2013

(86) PCT No.: PCT/JP2013/000888
§ 371 (c)(1),
(2) Date: Aug. 8, 2014

(87) PCT Pub. No.: WO2013/125205
PCT Pub. Date: Aug. 29, 2013

(65) Prior Publication Data
US 2015/0013295 A1    Jan. 15, 2015

(30) Foreign Application Priority Data
Feb. 23, 2012 (JP) ................... 2012-037367

(51) Int. Cl.
*B01D 39/16* (2006.01)
*B01D 46/54* (2006.01)
(Continued)

(52) U.S. Cl.
CPC .............. *B01D 46/543* (2013.01); *B01D 39/16* (2013.01); *B01D 39/163* (2013.01);
(Continued)

(58) Field of Classification Search
CPC .. B01D 39/16; B01D 39/163; B01D 39/1692; B01D 46/543; B01D 53/228; B01D 69/10; B01D 71/26; B01D 71/36; B01D 71/48; B01D 2239/0216; B01D 2239/065; B32B 27/12; B32B 27/30; D01F 8/06; D01F 8/14; D04H 1/541; D04H 3/147; D10B 2331/04
USPC ............................................. 55/524
See application file for complete search history.

(56) References Cited

U.S. PATENT DOCUMENTS 3,889,028 A * 6/1975 Hosterey et al. ............... 428/88
4,006,069 A * 2/1977 Hiratsuka et al. ............. 204/456
(Continued)

FOREIGN PATENT DOCUMENTS

JP   2001-098452   4/2001
JP   2004-181341   7/2004
(Continued)

*Primary Examiner* — Amber R Orlando
*Assistant Examiner* — Britanny Precht
(74) *Attorney, Agent, or Firm* — Hamre, Schumann, Mueller & Larson, P.C.

(57) ABSTRACT

The present invention provides a filter medium causing a low pressure drop. The present invention is a filter medium including a porous fluororesin membrane and an air-permeable support member laminated on at least one surface of the porous fluororesin membrane. In this filter medium, the air-permeable support member is a blended nonwoven fabric containing: core-sheath fibers (A) having a polyester core and a polyolefin sheath; polyester fibers (B); and core-sheath fibers (C) having a polyester core and a copolymerized polyester sheath.

14 Claims, 1 Drawing Sheet

(51) Int. Cl.

| | |
|---|---|
| *D04H 1/541* | (2012.01) |
| *B01D 69/10* | (2006.01) |
| *B01D 71/26* | (2006.01) |
| *B01D 71/36* | (2006.01) |
| *B01D 71/48* | (2006.01) |
| *B32B 27/12* | (2006.01) |
| *B32B 27/30* | (2006.01) |
| *D01F 8/06* | (2006.01) |
| *D01F 8/14* | (2006.01) |
| *B01D 53/22* | (2006.01) |
| *D04H 3/147* | (2012.01) |
| *B32B 5/02* | (2006.01) |
| *B32B 5/08* | (2006.01) |
| *B32B 27/32* | (2006.01) |

(52) U.S. Cl.
CPC ......... *B01D 39/1692* (2013.01); *B01D 53/228* (2013.01); *B01D 69/10* (2013.01); *B01D 71/26* (2013.01); *B01D 71/36* (2013.01); *B01D 71/48* (2013.01); *B32B 5/022* (2013.01); *B32B 5/08* (2013.01); *B32B 27/12* (2013.01); *B32B 27/30* (2013.01); *B32B 27/322* (2013.01); *D01F 8/06* (2013.01); *D01F 8/14* (2013.01); *D04H 1/541* (2013.01); *D04H 3/147* (2013.01); *B01D 2239/0216* (2013.01); *B01D 2239/0233* (2013.01); *B01D 2239/064* (2013.01); *B01D 2239/065* (2013.01); *B01D 2239/0636* (2013.01); *B32B 2262/0253* (2013.01); *B32B 2262/0276* (2013.01); *B32B 2262/0284* (2013.01); *B32B 2262/12* (2013.01); *B32B 2262/14* (2013.01); *B32B 2307/4026* (2013.01); *B32B 2307/7145* (2013.01); *B32B 2307/724* (2013.01); *D10B 2331/04* (2013.01); *D10B 2505/04* (2013.01); *Y10T 442/608* (2015.04); *Y10T 442/641* (2015.04)

(56) References Cited

U.S. PATENT DOCUMENTS

| | | | | |
|---|---|---|---|---|
| 4,444,854 | A * | 4/1984 | Hooke | 429/94 |
| 4,547,443 | A * | 10/1985 | Rowlette et al. | 429/217 |
| 4,639,292 | A * | 1/1987 | Ota et al. | 162/375 |
| 4,707,261 | A * | 11/1987 | Ikeyama et al. | 210/321.8 |
| 4,909,810 | A * | 3/1990 | Nakao et al. | 95/52 |
| 5,039,382 | A * | 8/1991 | Suzuki et al. | 205/521 |
| 5,234,739 | A * | 8/1993 | Tanaru et al. | 428/131 |
| 5,306,545 | A * | 4/1994 | Shirayanagi et al. | 428/198 |
| 5,555,549 | A * | 9/1996 | Nakaishi | 378/64 |
| 5,804,119 | A * | 9/1998 | Takagi | 264/169 |
| 5,910,277 | A * | 6/1999 | Ishino et al. | 264/127 |
| 5,972,538 | A * | 10/1999 | Saito et al. | 429/245 |
| 6,030,428 | A * | 2/2000 | Ishino et al. | 55/486 |
| 6,190,805 | B1 * | 2/2001 | Takeuchi et al. | 429/307 |
| 6,238,819 | B1 * | 5/2001 | Cahill et al. | 429/162 |
| 6,261,979 | B1 * | 7/2001 | Tanaka et al. | 442/370 |
| 6,653,393 | B2 * | 11/2003 | Ishii et al. | 524/546 |
| 2003/0082973 | A1 * | 5/2003 | Yamamoto et al. | 442/149 |
| 2003/0137798 | A1 * | 7/2003 | Kawasato et al. | 361/505 |
| 2003/0202316 | A1 * | 10/2003 | Kawasato et al. | 361/502 |
| 2005/0161411 | A1 * | 7/2005 | Boner et al. | 210/793 |
| 2009/0130371 | A1 * | 5/2009 | Horiguchi et al. | 428/91 |
| 2010/0269464 | A1 | 10/2010 | Mori et al. | |
| 2013/0330994 | A1 * | 12/2013 | Stoll | 442/335 |

FOREIGN PATENT DOCUMENTS

| | | |
|---|---|---|
| JP | 2005-253711 | 9/2005 |
| JP | 2008-114177 | 5/2008 |
| JP | 2009-136863 | 6/2009 |

* cited by examiner

BLENDED NONWOVEN FABRIC, FILTER MEDIUM, AND FILTER UNIT

TECHNICAL FIELD

The present invention relates to a filter medium including a porous fluororesin membrane and an air-permeable support member laminated thereon, a blended nonwoven fabric used as the air-permeable support member, and a filter unit including the filter medium.

BACKGROUND ART

Filter units having filter media are used to filter particles and others from gas streams. In the applications that require high collection efficiency, various filter media, for example, filter media including porous fluororesin membranes such as porous polytetrafluoroethylene (PTFE) membranes, filter media (glass filter media) obtained by adding binders to glass fibers and forming the resulting mixtures into paper sheets, and filter media (electret filter media) obtained by forming meltblown nonwoven fabrics into electrets, are used.

In particular, filter media including porous fluororesin membranes (porous fluororesin membrane type filter media) have the advantages of being less susceptible to problems such as formation of fibrils and self-dusting and of being less likely to cause an increase in pressure drop while in use. The porous fluororesin membrane type filter media also have the properties of fluororesins themselves. For example, since they have low friction coefficients and are very slippery, it is easy to remove collected dust by applying an impact to the porous membranes. Because of these many advantageous properties, the filter media including porous fluororesin membranes (in particular, porous PTFE membranes) are expected to be increasingly used in the future.

Porous fluororesin membranes are generally very flexible materials. On the other hand, filter media for filter units through which a large volume of air passes, such as, in particular, filter units for use in vacuum cleaners, are required to have a certain degree of rigidity so that they are resistant to being significantly deformed by the large volume of air. In response to this requirement, filter media including porous fluororesin membranes have a configuration in which an air-permeable support member as a reinforcing member is laminated on a porous fluororesin membrane as an air-permeable member. Various materials such as woven fabrics, nonwoven fabrics, metal or resin meshes, metal or resin nets, and resin foams are used for air-permeable support members. Nonwoven fabrics are often used because they are inexpensive. Nonwoven fabrics used for this purpose are generally those containing low melting point thermoplastic resins such as polyethylene and thus having thermally adhesive properties, like core-sheath fibers having a polyethylene terephthalate core and a polyethylene sheath. Such a nonwoven fabric is bonded to a porous fluororesin membrane by heat lamination to form a laminate thereof (see, for example, Patent Literature 1).

CITATION LIST

Patent Literature

Patent Literature 1: JP 2005-253711A

SUMMARY OF INVENTION

Technical Problem

It is preferable to minimize the pressure drop to minimize the energy required for filtration using a filter medium, but the filter medium disclosed in Patent Literature 1 has room for further improvement in terms of the pressure drop.

It is an object of the present invention to provide a filter medium causing a low pressure drop, a nonwoven fabric used as an air-permeable support member in the filter medium, and a filter unit using the filter medium.

Solution to Problem

The present invention is a filter medium including: a porous fluororesin membrane; and an air-permeable support member laminated on at least one surface of the porous fluororesin membrane. In this filter medium, the air-permeable support member is a blended nonwoven fabric containing: core-sheath fibers (A) having a polyester core and a polyolefin sheath; polyester fibers (B); and core-sheath fibers (C) having a polyester core and a copolymerized polyester sheath.

Preferably, in the filter medium of the present invention, the core-sheath fibers (A) are core-sheath fibers having a polyethylene terephthalate core and a polyethylene sheath, the polyester fibers (B) are polyethylene terephthalate fibers, and the core-sheath fibers (C) are core-sheath fibers having a polyethylene terephthalate core and a copolymerized polyethylene terephthalate sheath.

Preferably, the blended nonwoven fabric contains 10 to 40 wt. % of the core-sheath fibers (A), 20 to 80 wt. % of the polyester fibers (B), and 10 to 40 wt. % of the core-sheath fibers (C).

Preferably, the core-sheath fibers (A) have a fineness of 1 to 6 dtex, the polyester fibers (B) have a fineness of 6 to 25 dtex, and the core-sheath fibers (C) have a fineness of 1 to 6 dtex.

Preferably, the blended nonwoven fabric has a porosity of 65% or more and a weight per unit area of 60 g/m$^2$ or more.

Preferably, the porous fluororesin membrane is a porous polytetrafluoroethylene membrane.

Preferably, at least a portion of the polyolefin sheath of the core-sheath fibers (A) melts and allows the porous fluororesin membrane and the blended nonwoven fabric to be laminated together.

Preferably, the porous fluororesin membrane has an average pore diameter of 0.01 to 100 μm, causes a pressure drop of 10 to 300 Pa when air is passed through the porous fluororesin membrane at a flow rate of 5.3 cm/sec, and has a collection efficiency of 60% or more when a flow rate of a gas to be filtered is 5.3 cm/sec and a particle diameter of particles to be collected is in a range of 0.3 to 0.5 μm.

The present invention is also a filter unit including the above-described filter medium. The filter unit of the present invention is suitable for use in a vacuum cleaner.

The present invention is also a blended nonwoven fabric used as an air-permeable support member in a filter medium having a porous fluororesin membrane and the air-permeable support member laminated on at least one surface of the porous fluororesin membrane. This blended nonwoven fabric contains: core-sheath fibers (A) having a polyester core and a polyolefin sheath; polyester fibers (B); and core-sheath fibers (C) having a polyester core and a copolymerized polyester sheath.

Preferably, in the blended nonwoven fabric of the present invention, the core-sheath fibers (A) are core-sheath fibers having a polyethylene terephthalate core and a polyethylene sheath, the polyester fibers (B) are polyethylene terephthalate fibers, and the core-sheath fibers (C) are core-sheath fibers having a polyethylene terephthalate core and a copolymerized polyethylene terephthalate sheath.

Preferably, the blended nonwoven fabric of the present invention contains 10 to 40 wt. % of the core-sheath fibers (A), 20 to 80 wt. % of the polyester fibers (B), and 10 to 40 wt. % of the core-sheath fibers (C).

Preferably, in the blended nonwoven fabric of the present invention, the core-sheath fibers (A) have a fineness of 1 to 6 dtex, the polyester fibers (B) have a fineness of 6 to 25 dtex, and the core-sheath fibers (C) have a fineness of 1 to 6 dtex.

Preferably, the blended nonwoven fabric of the present invention has a porosity of 65% or more and a weight per unit area of 60 g/m² or more.

Advantageous Effects of Invention

The present invention provides a filter medium and a filter unit causing a low pressure drop.

DESCRIPTION OF EMBODIMENTS

Figure 1:
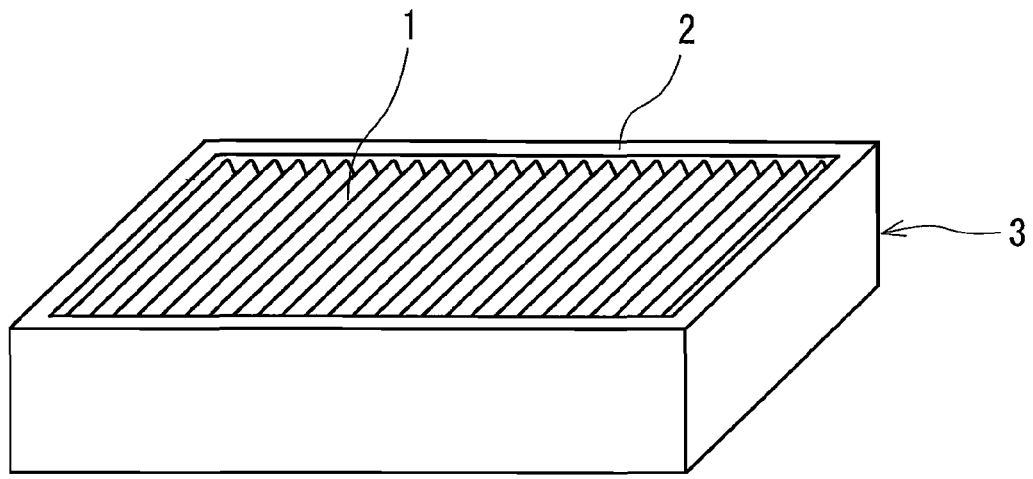
FIG. 1 is a perspective view showing an example of a filter unit of the present invention.

As described above, a conventional filter medium including a porous fluororesin membrane and a nonwoven fabric is produced by thermally bonding the porous fluororesin membrane and the nonwoven fabric by heat lamination. The present inventors have intensively studied and have found that passage of a fluid is limited in bonding portions at the interface between the porous fluororesin membrane and the nonwoven fabric and this limited passage of the fluid is one of the causes of the pressure drop. During heat lamination, pressure and heat are applied to the entire surface of the porous fluororesin membrane and that of the nonwoven fabric. Therefore, the porous fluororesin membrane and the nonwoven fabric have many bonding portions at the interface therebetween. Based on these findings, the present inventors have considered it possible to configure a filter medium causing a low pressure drop if the number of the bonding portions formed by heat lamination at the interface between the porous fluororesin membrane and the nonwoven fabric can be reduced, and have achieved this by means of a filter medium including: a porous fluororesin membrane; and an air-permeable support member laminated on at least one surface of the porous fluororesin membrane, wherein the air-permeable support member is a blended nonwoven fabric containing: core-sheath fibers (A) having a polyester core and a polyolefin sheath; polyester fibers (B); and core-sheath fibers (C) having a polyester core and a copolymerized polyester sheath.

In the present invention, the pressure drop means a difference in pressure before and after a fluid passes through a filter medium.

Examples of the fluororesin constituting the porous fluororesin membrane used in the present invention include polyvinylidene fluoride, polytetrafluoroethylene (PTFE), ethylene-tetrafluoroethylene copolymer, tetrafluoroethylene-hexafluoropropylene copolymer, and tetrafluoroethylene-perfluoroalkyl vinyl ether copolymer. Among these, PTFE is most suitable because of its versatility.

As the porous fluororesin membrane, one having an average pore diameter of 0.01 to 100 µm is suitably used, and one having an average pore diameter of 0.01 to 50 µm is more suitably used.

As the porous fluororesin membrane, one causing a pressure drop of 10 to 300 Pa when air is passed through the membrane at a flow rate of 5.3 cm/sec is suitably used, and one causing a pressure drop of 10 to 100 Pa is more suitably used.

As the porous fluororesin membrane, one having a collection efficiency of 60% or more when the flow rate of a gas to be filtered is 5.3 cm/sec and the particle diameter of particles to be collected is in a range of 0.3 to 0.5 µm is suitably used, and one having a collection efficiency of 70 to 99.99% is more suitably used.

A porous fluororesin membrane causing a pressure drop in the above range and having a collection efficiency in the above range can be obtained by appropriately setting the average pore diameter, porosity, and thickness of the porous fluororesin membrane.

The thickness of the porous fluororesin membrane is preferably 1 to 300 µm, and more preferably 2 to 100 µm.

The porous fluororesin membrane can be obtained as a commercially available product, and can also be produced by a known method. As an example, a porous PTFE membrane can be produced by stretching a PTFE sheet obtained by paste extrusion of PTFE fine powder as a raw material. The PTFE sheet can be stretched at an area stretch ratio (the product of the stretch ratio in a uniaxial direction and the stretch ratio in a direction perpendicular to the uniaxial direction) of about 50 to 900.

Next, a blended nonwoven fabric (which is also the blended nonwoven fabric of the present invention) used as an air-permeable support member in the filter medium of the present invention is described.

The core-sheath fibers (A) impart adhesive properties to the nonwoven fabric. The core-sheath fibers (A) has a polyolefin sheath. When the porous fluororesin membrane and the nonwoven fabric are heat-laminated, a portion of the polyolefin melts and allows bonding portions to be formed at the interface between the porous fluororesin membrane and the nonwoven fabric.

Examples of the polyester constituting the core of the core-sheath fibers (A) include polyethylene terephthalate (PET), polypropylene terephthalate, polybutylene terephthalate, polyethylene naphthalate, and polybutylene naphthalate. PET is preferred.

Examples of the polyolefin constituting the sheath of the core-sheath fibers (A) include polyethylene (PE), polypropylene (PP), polybutylene, polymethylpentene, and ethylene-propylene copolymer. Among these, polyethylene is preferred.

The fineness of the core-sheath fibers (A) is preferably 1 to 10 dtex, and more preferably 1 to 6 dtex. When the fineness is less than 1 dtex, the pressure drop of the nonwoven fabric may become too high. When the fineness is more than 10 dtex, the bonding strength between the nonwoven fabric and the porous fluororesin membrane may decrease and the collection efficiency may also decrease. The fiber length of the core-sheath fibers (A) is preferably 5 to 100 mm, and more preferably 20 to 80 mm. When the core-sheath fibers (A) having a short fiber length are used, the ease of folding the filter medium is improved during the pleating process.

The polyester fibers (B) themselves have high rigidity and impart rigidity to the nonwoven fabric. Examples of the polyester fibers (B) that may be used include PET fibers, polypropylene terephthalate fibers, polybutylene terephthalate fibers, polyethylene naphthalate fibers, and polybutylene naphthalate fibers. Among these, PET fibers can be suitably used.

The fineness of the polyester fibers (B) is preferably 1 to 50 dtex, and more preferably 6 to 25 dtex. When the fineness is less than 1 dtex, the pressure drop may become too high. When the fineness is more than 50 dtex, the collection efficiency may decrease. The fiber length of the polyester fibers (B) is preferably 5 to 100 mm, and more preferably 20 to 80 mm. When the polyester fibers (B) having a short fiber length are used, the ease of folding the filter medium is improved during the pleating process.

The core-sheath fibers (C) cause bonding between the core-sheath fibers (C) and the polyester fibers (B) and between the core-sheath fibers (C) themselves, thereby imparting high rigidity to the nonwoven fabric.

Examples of the polyester constituting the core of the core-sheath fibers (C) include PET, polypropylene terephthalate, polybutylene terephthalate, polyethylene naphthalate, and polybutylene naphthalate. Among these, PET is preferred.

Examples of the copolymerized polyester constituting the sheath of the core-sheath fibers (C) include copolymers obtained by copolymerizing polyesters such as PET, polypropylene terephthalate, polybutylene terephthalate, polyethylene naphthalate, and polybutylene naphthalate with at least one selected from the group consisting of phthalic acid, isophthalic acid, 5-sodium sulfoisophthalic acid, adipic acid, sebacic acid, 1,4-butanediol, diethylene glycol, polyethylene glycol, $\epsilon$-caprolactone, and lactic acid. The copolymerized polyester is preferably copolymerized PET. PET copolymerized with isophthalic acid, PET copolymerized with 1,4-butanediol, and PET copolymerized with $\epsilon$-caprolactone and 1,4-butanediol are particularly preferred because of their physical properties and availability. The copolymerized polyester having a lower melting point than the polyester constituting the core of the core-sheath fibers (C) should be selected.

The fineness of the core-sheath fibers (C) is preferably 1 to 10 dtex, and more preferably 1 to 6 dtex. When the fineness is less than 1 dtex, the pressure drop of the nonwoven fabric may become too high. When the fineness is more than 10 dtex, the bonding strength between the fibers may decrease, resulting in insufficient rigidity of the nonwoven fabric, and the collection efficiency may also decrease. The fiber length of the core-sheath fibers (C) is preferably 5 to 100 mm, and more preferably 20 to 80 mm. When the core-sheath fibers (C) having a short fiber length are used, the ease of folding the filter medium is improved during the pleating process.

Conventionally, nonwoven fabrics consisting of fibers corresponding to the core-sheath fibers (A) are used. In contrast, the nonwoven fabric of the present invention is a blended nonwoven fabric made of a mixture of the core-sheath fibers (A) and other fibers. That is, the content of the core-sheath fibers (A) is reduced and thus the number of the bonding portions formed by heat lamination at the interface between the porous fluororesin membrane and the nonwoven fabric is reduced. It is possible to use a nonwoven fabric consisting of a single type of fibers having a higher dtex value (or a lower fineness) (resulting in a more coarse nonwoven fabric) so as to reduce the number of the bonding portions. In this case, however, since the contact points between the nonwoven fabric and the porous fluororesin membrane are reduced, each of the bonding portions (or contact points) is subjected to greater pressure during heat lamination, which damages the porous fluororesin membrane, resulting in a decrease in the collection efficiency. However, in the case where the number of the bonding portions is reduced by means of the blended nonwoven fabric as in the present invention, the polyester fibers (B) remain unmelted at a heat lamination temperature and are present between the porous fluororesin membrane and the core-sheath fibers (A). Thanks to the presence of the polyester fibers (B), the contact points between the porous fluororesin membrane and the nonwoven fabric decrease only slightly during heat lamination, and thus the pressure is distributed to these contact points. Presumably, this is why an increase in the pressure drop can be reduced without a decrease in the collection efficiency. The rigidity of the filter medium decreases as the number of the bonding portions decreases, but such a decrease in the rigidity is compensated by blending the core-sheath fibers (A) with the polyester fibers (B) and the core-sheath fibers (C).

From the viewpoints of the adhesion to the porous fluororesin membrane, the rigidity of the nonwoven fabric, and the pressure drop of the resulting filter medium, the preferred contents of these fibers (A) to (C) in the nonwoven fabric are as follows. The content of the core-sheath fibers (A) is preferably 1 to 80 wt. %, and more preferably 10 to 40 wt. %. The content of the polyester fibers (B) is preferably 10 to 90 wt. %, and more preferably 20 to 80 wt. %. The content of the core-sheath fibers (C) is preferably 1 to 80 wt. %, and more preferably 10 to 40 wt. %.

The weight per unit area of the nonwoven fabric is preferably 10 g/m$^2$ or more, and more preferably 60 g/m$^2$ or more, from the viewpoints of the reinforcing effect and the formability of the nonwoven fabric. On the other hand, from the viewpoints of the cost and the formability, the weight per unit area is preferably 1000 g/m$^2$ or less, and more preferably 400 g/m$^2$ or less.

The porosity of the nonwoven fabric is preferably 65% or more, and more preferably 70% or more, from the viewpoint of the pressure drop. On the other hand, from the viewpoints of the collection efficiency and the rigidity of the nonwoven fabric, the porosity of the nonwoven fabric is preferably 90% or less, and more preferably 85% or less. The porosity of the nonwoven fabric can be calculated by the following equation:

$$\text{Porosity}(\%) = [1-(b/a \times c)] \times 100$$

where a is the density of the fibers themselves used in the nonwoven fabric, b is the weight per unit area of the nonwoven fabric, and c is the thickness of the nonwoven fabric.

The thickness of the nonwoven fabric is not particularly limited, but from the viewpoints of the rigidity and the pressure drop of the nonwoven fabric, the thickness is preferably 200 to 2000 μm, and more preferably 250 to 1000 μm.

The nonwoven fabric can be produced by a known method. For example, the nonwoven fabric can be obtained as follows. The fibers (A) to (C) are crimped, cut into pieces with a predetermined length, and then blended together at a ratio determined according to the intended use or the properties required. A web of the fibers is formed by a carding machine, an air layer, or the like, and then the binder component in the fibers is melted in a heat treatment apparatus so as to spot-bond the fibers. In this case, the fibers may be needled before the heat treatment. Examples of the heat treatment apparatus that may be used include a hot air circulation dryer, a hot air cross-flow dryer, a suction drum dryer, and a Yankee drum dryer. The heat treatment can be performed at a treatment temperature and for a treatment time selected based on the melting point of the binder component. Furthermore, the fibers may be hot-pressed between a pair of heated rollers at a controlled pressure to obtain the nonwoven fabric with a desired thickness.

Liquid-repellent treatment (water-repellent treatment and/or oil-repellent treatment) may be applied to the filter medium of the present invention. In this case, a filter medium having liquid repellency is obtained. In the case of such a liquid repellent filter medium, it is easy to wash the filter medium or mechanically shake the filter medium to remove the substances collected in the filter medium.

Antibacterial treatment may be applied to the filter medium of the present invention. In this case, a filter medium having antibacterial properties is obtained. In the case of such an antibacterial filter medium for use in a vacuum cleaner, for example, it is possible to inhibit bacterial growth in the vacuum cleaner.

Deodorizing treatment may be applied to the filter medium of the present invention. In this case, a filter medium having deodorizing properties is obtained. In the case of such a deodorant filter medium for use in a vacuum cleaner, for example, it is possible to reduce the odor in the vacuum cleaner.

The filter medium of the present invention may further include a laminated layer (or layers) other than the porous fluororesin membrane and the blended nonwoven fabric, if necessary, as long as the object of the present invention is not impaired.

In the filter medium of the present invention, a plurality of porous fluororesin membranes may be used. Likewise, a plurality of blended nonwoven fabrics may be used. In this case, either the porous fluororesin membrane or the blended nonwoven fabric may be the outermost layer.

The filter medium of the present invention may be pleated, if necessary, and the shape of the pleats is not particularly limited. A flat sheet-like filter medium may be continuously fed for pleating, or a filter medium may be cut into an appropriate size sheet (single sheet) for pleating. For pleating of a flat sheet-like filter medium, a known pleating machine (such as a rotary pleating machine, a reciprocating pleating machine, or a striping pleating machine) can be used. From the viewpoint of reducing the damage to the filter medium during the pleating process, a reciprocating pleating machine is preferably used.

In the filter medium of the present invention, the porous fluororesin membrane or the nonwoven fabric may be colored. The porous fluororesin membrane or the nonwoven fabric can be colored by a known method, for example, by kneading a pigment into the raw material of the porous fluororesin membrane or the nonwoven fabric, by dyeing the nonwoven fabric, or depositing a pigment or the like onto the surface of the nonwoven fabric by post-treatment or the like.

The filter medium of the present invention can be produced by laminating the porous fluororesin membrane and the blended nonwoven fabric together by a known method. Preferably, the filter medium is produced by heat-laminating the porous fluororesin membrane and the blended nonwoven fabric together. In the heat lamination, at least a portion of the polyolefin sheath of the core-sheath fibers (A) melts and allows the porous fluororesin membrane and the blended nonwoven fabric to be bonded together to form a laminate. A long roll of a stack of the porous fluororesin membrane and the blended nonwoven fabric may be continuously subjected to heat lamination, or short sheets of stacks of the porous fluororesin membrane and the blended nonwoven fabric may be individually subjected to heat lamination. Specifically, heat lamination can be performed such that the porous fluororesin membrane and the blended nonwoven fabric are stacked on one another and the resulting stack is passed through a pair of heated rolls to apply heat and pressure to the stack. An adhesive or a hot-melt agent can also be used as a method for lamination, but the use of an adhesive or a hot-melt agent has disadvantages such as a decrease in yield due to an increase in production processes and outgassing from the adhesive during heating.

The filter medium of the present invention has an advantage of causing a low pressure drop. In addition, the filter medium of the present invention has sufficient rigidity and also has advantageous properties of the porous fluororesin membrane. The filter medium of the present invention can be used in various applications. For example, the filter medium can be used in a clean room, a mask, a household electrical appliance, etc.

The present invention is also a filter unit including the above-described filter medium.

Examples of the form of a filter unit include a filter bag, a filter tube, a filter panel unit, and a filter cartridge.

The filter unit in a typical configuration includes the above-described filter medium and a support frame. The filter unit can be produced by a known method, for example, by insert-molding, using the filter medium and the resin constituting the support frame.

FIG. 1 shows a configuration example of a filter unit of the present invention. A filter unit 3 is configured such that a pleated filter medium 1 is supported by a support frame 2 placed around the filter medium 1. An unpleated filter medium may also be used as the filter medium 1.

Figure 2:
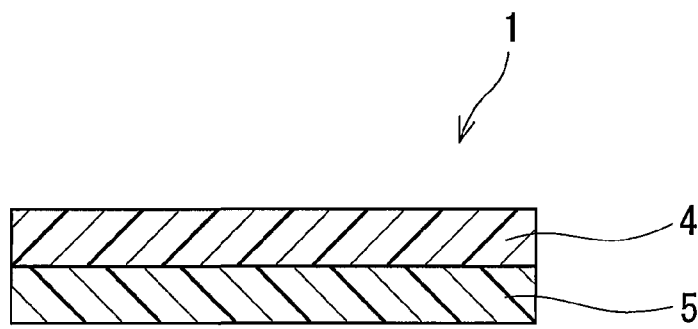
FIG. 2 is a cross-sectional view of an example of a filter medium of the present invention.

As shown in FIG. 2, the filter medium 1 has a structure in which a porous fluororesin membrane 4 and a blended nonwoven fabric 5 are laminated together.

A resin is used as the material of the support frame 2. Examples of the resin that can be used for the support frame 2 include acrylonitrile-butadiene-styrene copolymer (ABS), polycarbonate, polypropylene, and various types of elastomers. Polypropylene or ABS is commonly used, but ABS is suitably used because the dimensional accuracy of the resulting frame can be easily obtained and the deformation thereof can be suppressed when used. Furthermore, the resin may contain a filler such as glass fibers. In this case, the dimensional accuracy of the support frame 2 is improved further.

When the filter unit 3 is used, dust can be collected in the valleys of the pleats of the filter medium 1. Therefore, it is easy to remove the collected dust by applying an impact to these valleys from the downstream side of the filter unit.

The filter unit of the present invention causes a low pressure drop and therefore can be used in various applications. For example, the filter unit can be used as an air filter unit for use in a clean room, a filter unit for use in a household electrical appliance, etc. The filter unit of the present invention can be particularly suitably used as a filter unit for use in a vacuum cleaner.

EXAMPLES

Hereinafter, the present invention will be described in detail with reference to Examples and Comparative Examples, but the present invention is not limited to these Examples.

Example 1

First, 25 parts by weight of hydrocarbon oil "Isopar M" (trade name) (Esso Oil Co.) serving as a liquid lubricant was uniformly mixed with 100 parts by weight of PTFE fine powder "Polyflon F-104" (trade name) (Daikin Industries, Ltd.). Next, the resulting mixture was preformed under a pressure of 20 MPa and then extruded into a rod. This extruded rod was passed through a pair of metal rolls. Thus, a strip-like PTFE sheet with a thickness of 0.2 mm and a width of 150 mm was obtained.

Next, the sheet thus obtained was heated to 220° C. to remove the liquid lubricant contained in the sheet. Then, this unsintered PTFE sheet was stretched by a factor of 20 in the MD (machine direction), and then stretched by a factor of 30 in the TD (transverse direction). Then, the resulting sheet was sintered at a temperature of the melting point of PTFE or higher, with the dimensions of the sheet being fixed. Thus, a strip-like porous PTFE membrane was obtained. The average pore diameter of this porous PTFE membrane was 10 µm, the pressure drop thereof was 40 Pa when air was passed through the porous PTFE membrane at a flow rate of 5.3 cm/sec, and the collection efficiency thereof was 80% when the flow rate of a gas to be filtered was 5.3 cm/sec and the particle diameter of particles to be collected was in a range of 0.3 to 0.5 µm.

As the air-permeable support member, a 300-µm thick blended nonwoven fabric made of short fibers composed of three different components was prepared. This nonwoven fabric contained PET-PE core-sheath fibers (a content of 25 wt. %, a fineness of 4.4 dtex, and a fiber length of 51 mm), PET fibers (a content of 40 wt. %, a fineness of 17 dtex, a fiber length of 51 mm), and PET-isophthalic acid copolymerized PET core-sheath fibers (a content of 35 wt. %, a fineness of 4.4 dtex, a fiber length of 51 mm, and a copolymerized component softening point of 110° C.). The weight per unit area and the porosity of the nonwoven fabric were 100 g/m$^2$ and 75%, respectively.

The porous PTFE membrane produced as described above was sandwiched between two nonwoven fabrics, and they were heat-laminated at a temperature of 200° C. and a pressure of about 0.1 to 0.5 kPa. Thus, a filter medium of a three-layer structure was obtained.

Example 2

A filter medium was obtained in the same manner as in Example 1, except that the thickness, the weight per unit area, and the porosity of the three-component short fiber-blended nonwoven fabric used in Example 1 were changed to 750 µm, 200 g/m$^2$, and 80%, respectively.

Comparative Example 1

A filter medium was produced in the same manner as in Example 1, except that a three-component laminated nonwoven fabric with a thickness of 350 µm was used instead of the three-component-blended nonwoven fabric. This three-component-laminated nonwoven fabric had a PET-PE core-sheath fiber layer (a content of 25 wt. %, a fineness of 2.2 dtex, and a fiber length of 51 mm), a PET fiber layer (a content of 50 wt. %, a fineness of 17 dtex, and a fiber length of 51 mm), and a PET-isophthalic acid copolymerized PET core-sheath fiber layer (a content of 25 wt. %, a fineness of 2.2 dtex, and a fiber length of 51 mm), and a porous PTFE membrane was heat laminated to the surface of the PET-PE core-sheath fiber layer of the nonwoven fabric. The weight per unit area and the porosity of the three-component-laminated nonwoven fabric were 100 g/m$^2$ and 79%, respectively.

Measurement of Pressure Drop

Each of the filter media of Examples and Comparative Example was set in a cylindrical holder with an effective area of 100 cm$^2$. A pressure difference was created between both sides of the filter medium to allow air to pass through the filter medium. The flow rate of the air passing through the filter medium was adjusted to 5.3 cm/sec (a flow volume of 31.8 m$^3$/min) using a flowmeter, and the pressure drop at an air flow rate of 5.3 cm/sec was measured with a manometer. This measurement was also performed on each nonwoven fabric used. Samples each in which the porous fluororesin membrane and the nonwoven fabric of Examples and Comparative Example were merely stacked were prepared, and the same experiments were performed using these samples. The measurement result of each of these samples was used as the pressure drop before lamination. The value of the pressure drop of the filter medium was divided by the value of the pressure drop before lamination, and the obtained value was used to calculate the rate of increase in pressure drop by lamination. Table 1 shows the results.

TABLE 1

|  | Example 1 | Example 2 | Comparative Example 1 |
|---|---|---|---|
| Weight per unit area of nonwoven fabric (g/m$^2$) | 100 | 200 | 100 |
| Pressure drop of nonwoven fabric (Pa) | 5.0 | 9.8 | 3.7 |
| Thickness of filter medium (µm) | 300 | 757 | 315 |
| Pressure drop of filter medium (Pa) | 36.2 | 31.3 | 42.7 |
| Rate of increase in pressure drop by lamination (%) | 28 | 10 | 55 |

Table 1 shows that the pressure drops of the filter media of Examples were lower by 6.5 to 11.4 Pa than the pressure drop of Comparative Example. The rates of increase in pressure drop by lamination were compared. As a result, the rates of increase in the pressure drop were 10 to 28% in Examples, which were lower than the rate in Comparative Example.

Presumably, this is because a blended fabric made of a mixture of the PET-PE core-sheath fibers and other components was used as the nonwoven fabric in Examples and therefore the amount of PE on the surface of the nonwoven fabric was reduced. This decrease in the amount of PE resulted in a decrease in the bonding points formed by heat lamination between the porous PTFE membrane and the nonwoven fabric and in a decrease in the number of pores filled with PE in the porous PTFE membrane.

INDUSTRIAL APPLICABILITY

The blended nonwoven fabric of the present invention is used as an air-permeable support member in a porous fluororesin membrane type filter medium. The filter medium of the present invention can be used in a clean room, a mask, and a household electrical appliance. The filter unit of the present invention can be used as an air filter unit for use in a clean room, a filter unit for use in a household electrical appliance, or the like. The filter unit of the present invention can be particularly suitably used as a filter unit for use in a vacuum cleaner.

The invention claimed is:

1. A filter medium comprising: a porous fluororesin membrane; and an air-permeable support member laminated on at least one surface of the porous fluororesin membrane, wherein the air-permeable support member is a blended nonwoven fabric comprising: core-sheath fibers (A) having a polyester core and a polyolefin sheath; polyester fibers (B); and core-sheath fibers (C) having a polyester core and a copolymerized polyester sheath, wherein the core-sheath fibers (A) have a fineness of 1 to 6 dtex, the polyester fibers (B) have a fineness of 6 to 25 dtex, and the core-sheath fibers (C) have a fineness of 1 to 6 dtex, and the blended nonwoven fabric is a mixture of the core-sheath fibers (A) having a polyester core and a polyolefin sheath; the polyester fibers (B); and the core-sheath fibers (C) having a polyester core and copolymerized polyester sheath, with the polyester fibers (B) and the core-sheath fibers (C) having a polyester core and a copolymerized polyester sheath being present at a surface of the blended nonwoven fabric contacting the porous fluororesin membrane.

2. The filter medium according to claim 1, wherein the core-sheath fibers (A) are core-sheath fibers having a polyethylene terephthalate core and a polyethylene sheath, the polyester fibers (B) are polyethylene terephthalate fibers, and the core-sheath fibers (C) are core-sheath fibers having a polyethylene terephthalate core and a copolymerized polyethylene terephthalate sheath.

3. The filter medium according to claim 1, wherein the blended nonwoven fabric comprises 10 to 40 wt. % of the core-sheath fibers (A), 20 to 80 wt. % of the polyester fibers (B), and 10 to 40 wt. % of the core-sheath fibers (C).

4. The filter medium according to claim 1, wherein the blended nonwoven fabric has a porosity of 65% or more and a weight per unit area of 60 g/m² or more.

5. The filter medium according to claim 1, wherein the porous fluororesin membrane is a porous polytetrafluoroethylene membrane.

6. The filter medium according to claim 1, wherein at least a portion of the polyolefin sheath of the core-sheath fibers (A) melts and allows the porous fluororesin membrane and the blended nonwoven fabric to be laminated together.

7. The filter medium according to claim 1, wherein the porous fluororesin membrane has an average pore diameter of 0.01 to 100 μm, causes a pressure drop of 10 to 300 Pa when air is passed through the porous fluororesin membrane at a flow rate of 5.3 cm/sec, and has a collection efficiency of 60% or more when a flow rate of a gas to be filtered is 5.3 cm/sec and a particle diameter of particles to be collected is in a range of 0.3 to 0.5 μm.

8. A filter unit comprising the filter medium according to claim 1.

9. A vacuum cleaner comprising the filter unit according to claim 8.

10. A blended nonwoven fabric comprising: core-sheath fibers (A) having a polyester core and a polyolefin sheath; polyester fibers (B); and core-sheath fibers (C) having a polyester core and a copolymerized polyester sheath, wherein the core-sheath fibers (A) have a fineness of 1 to 6 dtex, the polyester fibers (B) have a fineness of 6 to 25 dtex and the core-sheath fibers (C) have a fineness of 1 to 6 dtex.

11. The blended nonwoven fabric according to claim 10, wherein the core-sheath fibers (A) are core-sheath fibers having a polyethylene terephthalate core and a polyethylene sheath, the polyester fibers (B) are polyethylene terephthalate fibers, and the core-sheath fibers (C) are core-sheath fibers having a polyethylene terephthalate core and a copolymerized polyethylene terephthalate sheath.

12. The blended nonwoven fabric according to claim 10, wherein the blended nonwoven fabric comprises 10 to 40 wt. % of the core-sheath fibers (A), 20 to 80 wt. % of the polyester fibers (B), and 10 to 40 wt. % of the core-sheath fibers (C).

13. The blended nonwoven fabric according to claim 10, wherein the blended nonwoven fabric has a porosity of 65% or more and a weight per unit area of 60 g/m² or more.

14. The filter medium according to claim 1, wherein welded portions and unwelded portions are present at the interface between the porous fluororesin membrane and the blended nonwoven fabric, the welded portions being portions where the blended nonwoven fabric is welded to the porous fluororesin membrane, and the unwelded portions being portions where the blended nonwoven fabric is not welded to the porous fluororesin membrane, the welded portions have portions where at least a portion of the core-sheath fibers (A) melts and allows the core-sheath fibers (A) to be welded to the porous fluororesin membrane so that pores of the porous fluororesin membrane are filled with the core-sheath fibers (A), the unwelded portions have portions where the polyester fibers (B) are in contact with the porous fluororesin membrane, and the filter medium has first inner welded portions where the core-sheath fibers (C) are welded to the polyester fibers (B) and second inner welded portions where the core-sheath fibers (C) are welded to each other.

* * * * *